Nov. 17, 1964

H. H. BLISS ETAL 3,156,985

DEVICE FOR TEACHING ATOMIC STRUCTURE
AND THE PROPERTIES OF ELEMENTS

Filed Jan. 10, 1962

INVENTORS
HORACE H. BLISS &
GERALD B. EMORY

BY Dunlap Laney & Hubbard
ATTORNEYS

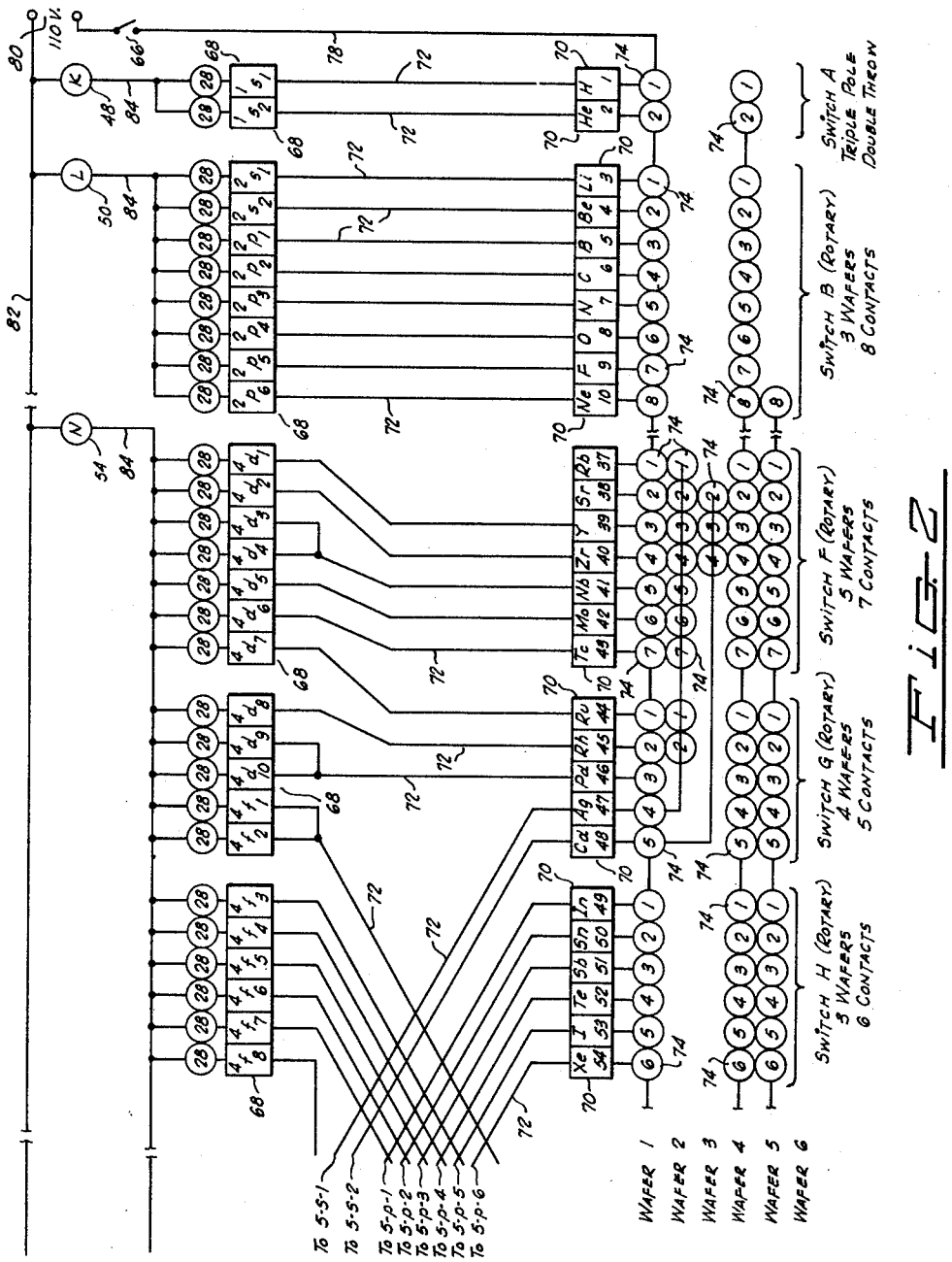

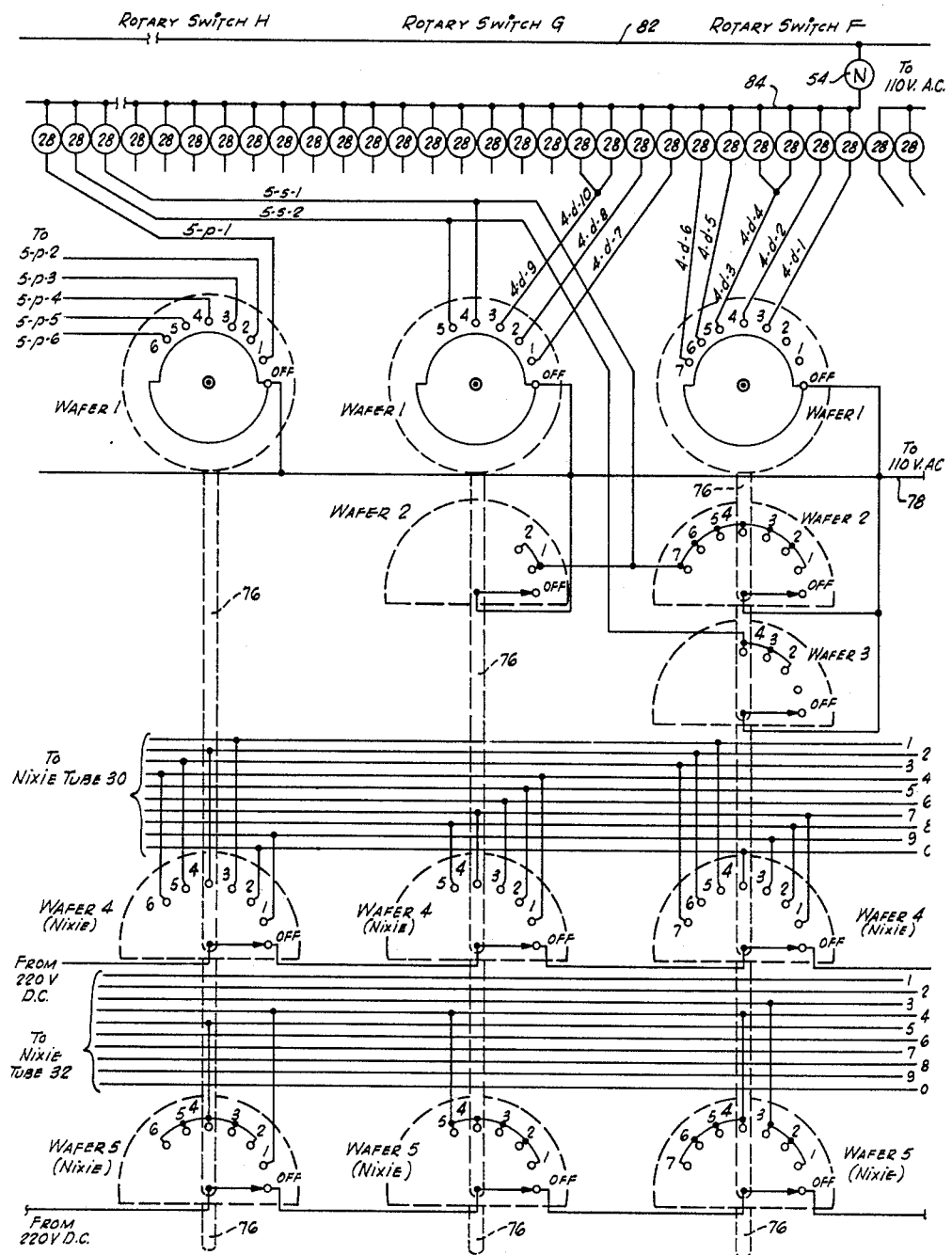

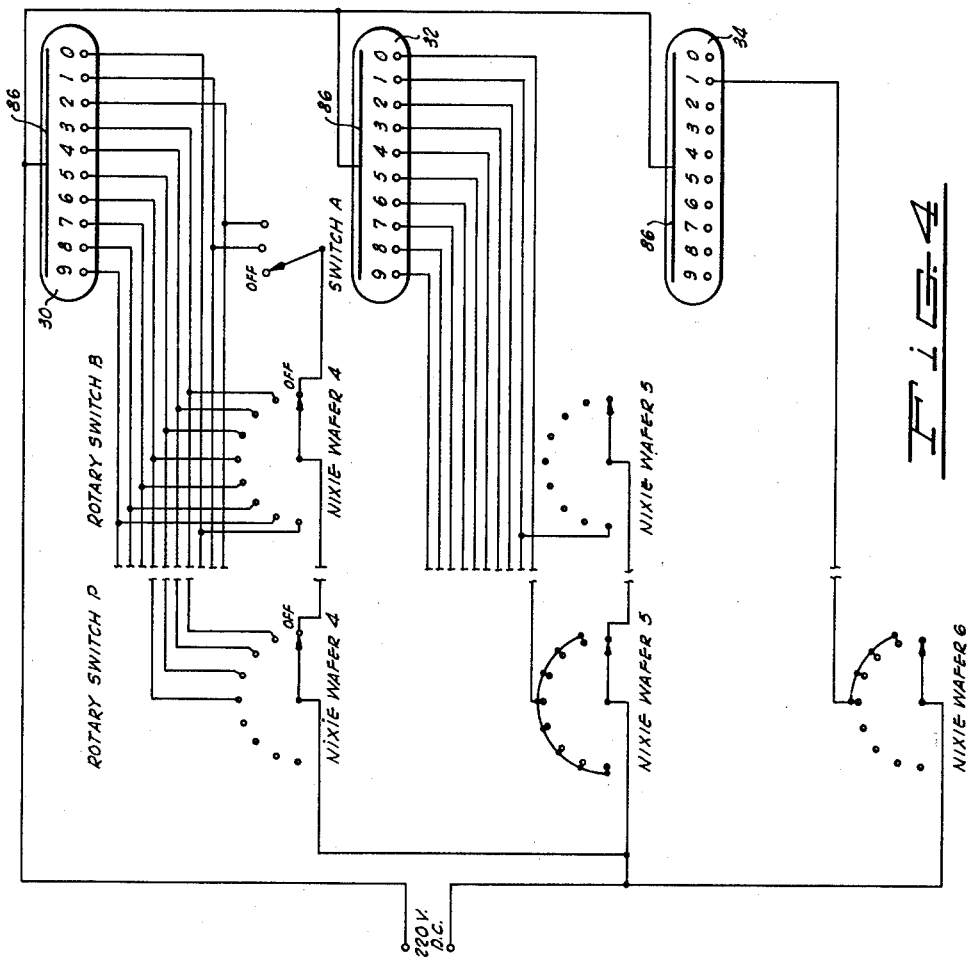
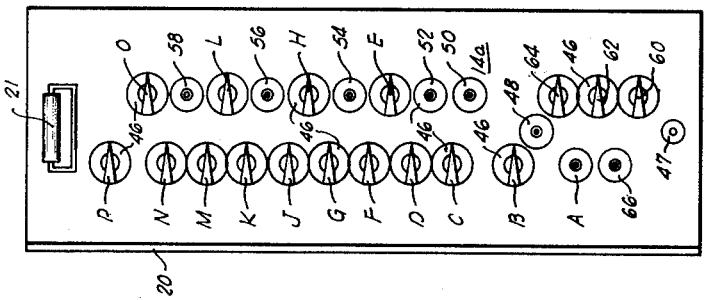

United States Patent Office

3,156,985
Patented Nov. 17, 1964

3,156,985
DEVICE FOR TEACHING ATOMIC STRUCTURE
AND THE PROPERTIES OF ELEMENTS
Horace H. Bliss, 1320 Huntington Way, Norman, Okla.,
and Gerald B. Emory, 230 E. 26th St., Ada, Okla.
Filed Jan. 10, 1962, Ser. No. 165,328
10 Claims. (Cl. 35—18)

This invention relates to a device for teaching the atomic structure, and the chemical and physical properties of elements. More particularly, but not by way of limitation, the present invention relates to a teaching device for visually informing and teaching students concerning the electronic, protonic and neutronic make-up of the known chemical elements, and also the relationship between the electronic character of chemical elements and the particular chemical properties which they display.

A number of apparatuses of varying types have heretofore been devised for the purpose of allowing certain knowledge of atomic structure and chemical properties to be visually imparted to students of chemistry and physics. Now well known among such devices are the periodic chart of the elements as initially devised by Mendelyeev, and the model of atomic nuclear and electronic structure as conceived by Niels Bohr and Rutherford around 1915. Since the original tabulation of the then known elements in related periods and groups by Mendelyeev, a number of additions to, and modifications in, the periodic table of the elements have been necessitated by an advance in the store of knowledge relating to atomic structure and chemical properties, as well as by the discovery of a number of new elements. The same is true with respect to atomic structure as conceived initially by Bohr and Rutherford.

As the secrets of the atom have been revealed by the aid of improved research techniques and apparatus, and the nature of subatomic matter has become better understood, the development of charts, models and other devices for enabling students of science to better visualize the relationships between chemical elements, and the nature of their atomic and subatomic particles has not kept pace with the advance of knowledge regarding these minute building blocks of the universe. For example, in chemistry and physics lecture rooms in most colleges and universities and in many high schools, the basic format of the original Mendelyeev periodic table is even yet retained in the large periodic table chart which hangs on the wall at the front of the lecture room. As is well known, the rare earth (lanthanide) and actinide elements do not fit the sequence of periods set up in such tables. The basic knowledge of the arrangement of electrons in atomic structure is visually demonstrated to students in many instances by a "rod and sphere" three-dimensional model, or by simply referring to drawings illustrating Rutherford and Bohr's original conception of the atomic nucleus and its surrounding electron shells while, at the same time, explaining that it is now known that atomic electrons orbit the nucleus of the atom in a manner differing somewhat from that proposed by Bohr.

Although substantially more comprehensive, logical and accurate graphical presentations of the periodic recurrence of similar chemical properties among the chemical elements than the Mendelyeev table have been proposed during recent years by later investigators, there still has not been proposed any device or apparatus which may be effectively used for visually demonstrating this knowledge to a group of students during the course of a lecture. Yet, the value of the visual display type of teaching device in conveying understanding to students has now long been recognized by the teaching profession, and such devices have been used to excellent advantage in certain courses of instruction recently offered by the military services to military personnel.

The present invention provides a device which may be effectively used conjunctively with oral instruction for visually demonstrating the electronic, protonic and neutronic structure of the atoms of the known chemical elements. Moreover, the device enables the student to grasp the nature of the periodic recurrence of similarities in the chemical properties of the elements, and to correlate such periodic recurrences with similarities of the arrangement of electrons in the atoms of the elements. A much improved understanding of the lanthanide (rare earth) and actinide elements and their chemical similarities is facilitated by the manner in which these elements are visually portrayed in graphic manner by the device. The manner in which atomic electrons obey Pauli's principle and Hund's rules can also be demonstrated by the device.

In addition to the named foregoing uses of the teaching device of the present invention, the device may be used for illustrating the concept of positive and negative electro-valence of the elements, the rearrangement of electrons in the electron orbitals of the transitional elements, filling of the orbitals of the elements in the order of the electron energy involved, the nuclear constitution of the isotopes of elements, and the dynamic, as opposed to static, nature of atomic electrons.

Aside from considerations of the facets of chemical and physical knowledge which may be conveyed by employing the present invention, the teaching device has marked advantages in the ease with which it may be manipulated by the instructor. A control panel which is readily accessible to the instructor, but hidden from the view of the students, permits the device to be used in a number of different ways according to the preferred organization of the instructor's lecture. Provision is made for easily and quickly repeating a given visual display if emphasis or review of the point under discussion is desired. In a practical aspect, the device is relatively compact and is sufficiently light to permit portability from one lecture room to another if desired. Also, the device may be effectively utilized in either natural or artificial light.

To briefly describe the structural character of the invention before proceeding to a more detailed discussion of the various parts and elements of the device and their function, the teaching device of the invention basically comprises a display board, having a large surface visible to the group of students to be taught; indicia provided on such visible surface representing the known chemical elements and arranged to permit the periodic recurrence among such elements of similar chemical properties to be visualized by the students; illuminating means provided in conjunction with such indicia and portraying the electronic structure of the atoms of each element; and control means facilitating the selective use of said illuminating means by the instructor in showing various concepts of electronic behavior, the similarities in the electronic structure of various elements, and the manner in which the atomic orbitals of the elements are filled with electrons. A salient feature of the invention is the particular manner in which element-representing indicia and the electron-representing illuminating means are arranged on the face of the board and relative to each other to convey the most lucid understanding of a substantial number of physical and chemical concepts to the observing students.

From the foregoing discussion, it will be apparent that a broad, major object of the present invention is to provide a device for visually portraying information relating to the chemical elements and their atomic constitution so that this information may be better understood by students viewing the device as it is displayed in conjunction with an oral lecture by an instructor.

Another object of the invention is to provide an effective teaching device for use in teaching chemistry and physics, which device may be easily manipulated by an instructor simultaneously with the delivery of oral instruction.

A more specific object of the invention is to provide a visual teaching device for use in teaching the arrangement of electrons in the various chemical elements, and the relation between such electron arrangement and the chemical properties possessed by the elements.

A further object of the invention is to provide a visual display board bearing a periodic table of the chemical elements which is of different and more useful form than the periodic tables which have previously been incorporated in visual display boards used as teaching aids.

An additional object of the invention is to provide a visual teaching device for teaching inorganic chemistry, which teaching aid is relatively simple and inexpensive to construct, is portable, and is characterized by a long and trouble-free service life.

Other objects and advantages, in addition to those hereinbefore mentioned, will become apparent and be more fully understood from a reading of the following detailed description of the invention in conjunction with a perusal of the accompanying drawings which illustrate our invention.

In the drawings:

FIGURE 2 is a diagrammatic presentation of a portion of the major electrical circuitry of the present invention illustrating the manner in which the display board of the invention is wired to facilitate maximum ease of operation by an instructor.

FIGURE 3 is a different type of electrical circuit diagram from that shown in FIGURE 2 and is included for the purpose of more clearly illustrating the manner in which certain switches are typically connected in the electrical circuitry.

FIGURE 4 is a diagram of the electrical circuitry which is employed in the invention for illuminating certain numerical indicia representing the atomic numbers of the various chemical elements. This figure also serves to illustrate the closely similar electrical circuitry used for illuminating numerical indicia representing the neutrons in the nuclei of the elements.

FIGURE 5 is a view in elevation of the end wall of the teaching device which carries the switch bank.

Figure 1:
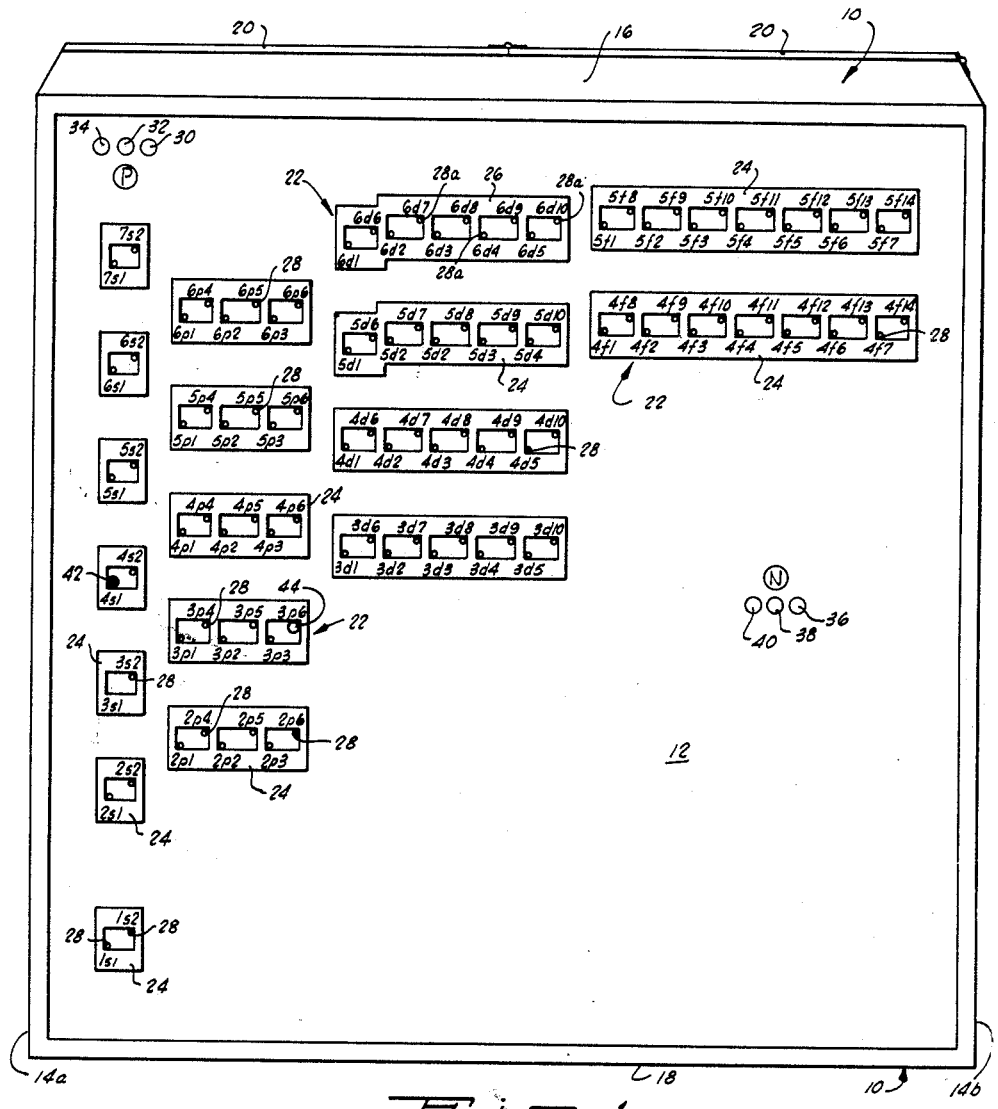
FIGURE 1 is an isometric view of the teaching device of the present invention.

Referring now the drawings in detail, and particularly to FIGURE 1, reference character 10 designates generally the visual display teaching device of the invention. The teaching device 10 comprises a rectangular, front panel 12 having a large surface area to facilitate unimpaired observation by students. The device 10 further includes a pair of opposed rectangular end walls 14a and 14b, and rectangular top and bottom walls, 16 and 18, respectively. Each of the end walls 14a and 14b, and the top and bottom walls 16 and 18 are secured at right angles to the front panel 12. A pair of contiguous rectangular back panels 20 are each hinged at one of their edges to each other and one of the panels is hinged at another edge to the end wall 14b. These back panels, when closed, complete the formation of the hollow, right parallelepiped, geometric configuration of the teaching device 10. A pair of handles 21 secured to each end wall 14a and 14b facilitate the transport of the teaching device. (See FIG. 5.)

Displayed upon the large exposed surface of the front panel 12 of the teaching device 10, are various indicia 22 graphically portraying the chemical elements and their electronic structure. A relatively large clear space is provided at the lower right side of the front panel 12 to permit certain information to be written in upon the panel by the instructor if this should prove desirable, or, alternately, to permit certain indicia bearing cards to be displayed in front of the panel for the purpose of conveying additional information to the students. The indicia 22 are in the form of colored rectangles 24 and 26 which are arranged in vertical columns and horizontal rows as is customary in all periodic tables of the elements. However, the arrangement of the columns and rows of elements on the surface of the front panel 12 of the device of the present invention is devised to convey a maximum of information concerning the manner in which the electronic configuration of the atom of each element is built up. The positioning of the elements on the panel 12 perhaps resembles the periodic table form proposed by Walker and Curthoys in 1956 more closely than other forms of such tables, but certain differences from, and improvements over, the former table will appear to those skilled in the art as the description of the present invention proceeds.

Each rectangle 24 represents two of the known chemical elements. In order to teach students the position in the periodic table which newly discovered or synthesized chemical elements may be expected to occupy, several additional rectangles 26 are provided at a specific location relative to the other rectangles 24 representing known elements. Rectangles representing elements belonging to the same family or group by virtue of the close similarity of their chemical properties are arranged in vertical alignment with each other.

The rectangles 24 and 26 are also grouped according to the quantum levels (or shells) and sublevels (or subshells) of the electrons of highest energy in the two elements which the particular rectangle represents. Thus, all of the electron shells have one "s" sublevel and this is represented for all shells by the first vertical column of rectangles 24. The shells, except for the Q shell, which are located farther from the nucleus of the atom of any element than the innermost, or K, shell each have a "p" sublevel which is represented by the three vertical columns of rectangles 24 which are grouped together. Three of the vertical columns are grouped together in the "p" sublevel because there can be three orbitals for extra-nuclear electrons within this sublevel. In similar manner, the "d" sublevel of those shells containing this sublevel is represented by the five vertical columns of rectangles 24 and 26 which are grouped in horizontal juxtaposition. The grouping of five is due to the existence of five orbitals within the "d" sublevel. Finally, the "f" sublevel, which occurs in the N and O shells, is represented by the seven short vertical columns which each contain two rectangles 24 and which are grouped in horizontal juxtaposition at the upper right of the front panel 12. The grouping of seven vertical columns in this "f" sublevel portrays the existence of seven electron orbitals within the "f" sublevel.

The vertical spacing between any two of the vertically aligned rectangles 24, or 24 and 26, represents the spacing between adjacent electron shells or quantum levels. It will be noted, however, that all of the horizontal rows of the rectangles are not aligned—rather, the rows are horizontally staggered. This is to facilitate the illustration or explanation of how the sublevels of some electron shells may overlap, or lie closer to the nucleus of the atom than some of the sublevels of an adjacent shell lying, as a whole, closer to the nucleus. Stated differently, the arrangement facilitates the explanation of how various sublevels in outlying shells may contain electrons of lower energy than the electrons in some of the sublevels of shells nearer to the atomic nucleus. The manner in which this is demonstrated with the device will be subsequently explained.

In each of the rectangles 24 and 26, a small neon bulb 28 is placed in diagonally opposite corners thereof. Each of these neon bulbs 28 represents or portrays an electron. Each may be individually lighted in the manner hereinafter described. It will be understood by those skilled in the art that each time an additional new electron is added to the electrons already present in an atomic structure, a new element is represented. Hence, as each new bulb 28 is lighted, a new element is represented, and, in general, its complete electronic structure is shown by all of the other neon bulbs 28 located in rectangles 24 and 26 disposed in atomic sublevels of lower energy. From what has been previously said, it will also be understood that each of the rectangles 24 and 26 represents an electron orbital within a particular shell sublevel. The presence of two bulbs (electrons) in each rectangle thus serves to demonstrate the Pauli principle that each orbital (rectangle) will accommodate two electrons having anti-parallel spins.

To complete the explanation of the indicia 22 shown on the front panel 12 of the device, a symbol consisting of a number, a letter, and a second number, such as 1–s-1, is placed in the border of each of the rectangles 24 and 26 adjacent one of the neon bulbs 28 therein. This symbol is for the purpose of identifying (a) the particular quantum level or shell in which is located the electron represented by the particular bulb, (b) the sublevel within such shell in which the electron is located, and (c) the total number of electrons in such subshell having an energy equal to or lower than said electron. By way of example, the rectangle 24 located at the lower left side of the panel 12 represents the elements hydrogen and helium. It contains two neon bulbs 28. When the lower left bulb is lit, the electronic structure of the element hydrogen is shown. The single electron of hydrogen is located in the first (or $n=1$) quantum or energy level (also referred to as the K shell). Therefore, the first number in the symbol placed adjacent the bulb is 1. There is only one sublevel in the K shell, or first quantum level. It is the "s" sublevel. Hence, the letter in the symbol is "s." The last character in the symbol is the number 1, indicating that 1 is the total number of electrons in the "s" sublevel having an energy equal to or lower than the electron represented by the lighted bulb.

When the second neon bulb 28 in this rectangle is lighted, the element helium's electronic configuration is portrayed. The symbol adjacent the bulb shows that the electron is located in the first quantum level (K shell), in the "s" sublevel, and that there are now in the "s" sublevel of the K shell, two electrons of equal or lower energy than the electron represented by the second neon bulb 18. The fact that both bulbs 28 are enclosed in the same rectangle 24 shows that the electrons they represent occupy the same orbital in the sublevel and have their spins coupled or anti-parallel in accordance with Pauli's principle.

In a preferred embodiment of the invention, each of the rectangles 24 and 26 is outlined by a relatively wide band of color, with a different color being selected for the rectangles grouped together in the various sublevels. This focuses the attention of the student upon the relation, as well as the differences, between the various sublevels. Thus, all of the "s" sublevels of the various shells may be outlined with red, the "p" sublevels with green, etc. Also, in the rectangles 26 representing elements as yet not synthesized, we prefer to use neon bulbs 28a having a different color from the other neon bulbs 28 on the panel 12 so that students will bear in mind the fact that the electronic configuration of these non-existent elements is purely theoretical and is based upon expectations derived from the knowledge of the manner in which the electronic structures of known elements are built up.

In the extreme, upper left-hand corner of the panel 12, three illuminable numerical indicating devices 30, 32 and 34 are disposed in horizontal alignment. In the illustrated preferred embodiment of the invention, these devices are electronic readout tubes, such as those sold under the trademark Nixie by the Burroughs Corporation of Plainfield, New Jersey. The numerical indicating devices 30, 32 and 34, which will hereinafter be referred to as Nixie tubes, indicate respectively the units, tens and hundreds digit of a three digit integer. The Nixie tubes 30, 32 and 34 are incorporated in the electrical circuitry of the invention so that the integer or number collectively registered by the tubes corresponds to the atomic number, or number of protons, which characterizes the particular element whose electronic configuration is being illustrated by the illumination of certain of the neon bulbs 28 on the panel 12 at any time. The electrical circuitry which includes the Nixie tubes 30, 32 and 34 and the neon bulbs 28 is explained in detail hereinafter.

At the center, right-hand side of the front panel 12, three additional Nixie tubes 36, 38 and 40 are disposed in horizontal alignment. These tubes are used to portray a number from 1 to 199 representing the number of neutrons in the atom of a particular element, and may also be used to indicate the atomic weights of the isotopes of an element. In order to aid the student in identifying the significance of the two numbers represented by the two sets of Nixie tubes, an illuminated letter P is placed adjacent the upper left tubes 30, 32 and 34 to signify that this number represents the number of protons in the nucleus of an element, or its atomic number, and an illuminated letter N is placed adjacent the center right Nixie tubes 36, 38 and 40 to signify that the number shown on these tubes is the number of neutrons in a particular atom. Although the electrical circuitry for lighting the letters P and N may be constructed to permit these letters to be individually and selectively illuminated, we prefer to have a common switch (later described) illuminate and darken both letters simultaneously, since we have found that there is little likelihood of confusion by the students when only one of the groups of Nixie tubes is being used to show either the atomic number or the number of neutrons.

Figure 6:
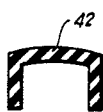
FIGURE 6 is a sectional view through one of the caps of opaque resilient material used to illustrate positive electro-valence.
Figure 7:
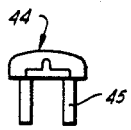
FIGURE 7 is a view in elevation of the illuminable member used to illustrate negative electro-valence.

In order to permit the concept of positive electrovalence to be demonstrated with our device, a cap 42 is provided which will fit snugly over any of the neon bulbs 28. This cap 42 is shown in position over one of the bulbs 28 in FIG. 1, and serves to darken the bulb, signifying that one of the valence electrons of an element has been lost, resulting in the formation of a positive ion. A sectional view through the cap 42 is shown in FIG. 6. Provision is also made for demonstrating negative electrovalence. This is accomplished by employing a large illuminable member 44 of different color than the neon bulbs 28, which member is superimposed over one of the bulbs 28 in the manner shown in FIG. 1. The member 44 is illuminated by electrical current derived from the electrical leads connected to each of the neon bulbs 28, the member having terminals 45 which contact these leads when it is placed in position over one of the neon bulbs. A detail view of the illuminable member 44 is shown in FIG. 7. When the member 44 is placed in position over one of the neon bulbs 28, its presence signifies that an electron has been gained or captured by the element, resulting in the formation of a negative ion. The constructions of the cap 42 and illuminable member 44 are illustrated in detail in FIGS. 6 and 7.

The switches for selectively controlling the illumination of the neon bulbs 28, the Nixie tubes 30, 32 and 34, the Nixie tubes 36, 38 and 40, and the P and N lights are located in recesses 46 formed in the end wall 14a. The switches appear in FIG. 5, and are designated as follows:

Main power switch 47;

Triple pole, double throw toggle switch A for selectively lighting the neon bulbs 28 representing the 1–S–1 and 1-S-2 electrons (hydrogen and helium) and the numbers 1 and 2 on units Nixie tube 30;

Rotary switch B for sequentially lighting the neon bulbs 28 representing all electrons in the L shell (both "s" and "p" sublevels) and the numbers 3 through 10 on the tens and units Nixie tubes 30 and 32.

Single pole, single throw toggle switch 48 for darkening both electrons in the K shell (first quantum level) simultaneously if desired;

Single pole, single throw toggle switch 50 for darkening all electrons in the L shell (second quantum level) simultaneously if desired;

Rotary switch C for sequentially lighting the neon bulbs 28 repersenting the electrons in the "s" and "p" sublevels of the M shell (third quantum level);

Rotary switch D for sequentially lighting the neon bulbs 28 representing the valence electrons in the elements potassium through cobalt, and for illuminating the numbers 19 through 27 on the tens and units atomic number Nixie tubes 30 and 32;

Rotary switch E for sequentially lighting the neon bulbs 28 representing the valence electrons of the elements nickel through krypton, and for simultaneously lighting the corresponding atomic numbers from 28 through 36 on the tens and units atomic number Nixie tubes 30 and 32;

Single pole, single throw toggle switch 52 for simultaneously darkening the neon bulbs 28 representing all the electrons in the M shells;

Rotary switch F for sequentially lighting the neon bulbs 28 representing the valence electrons of the elements rubidium through technetium and for lighting the corresponding atomic numbers upon the atomic number Nixie tubes 30 and 32.

Rotary switch G for sequentially lighting the neon bulbs 28 representing the valence electrons of the elements ruthenium through cadmium and for simultaneously lighting the corresponding atomic numbers upon the atomic number Nixie tubes 30 and 32;

Rotary switch H for selectively lighting the neon bulbs 28 representing the valence electrons of the elements indium through xenon, and for simultaneously lighting the corresponding atomic numbers upon the atomic number Nixie Tubes 30 and 32;

Rotary switch J for selectively lighting the neon bulbs 28 representing the valence electrons of the elements cesium through europium, and for lighting the corresponding atomic numbers upon the atomic number Nixie tubes 30 and 32;

Rotary switch K for selectively lighting the neon bulbs 28 representing the valence electrons of the elements gadolinium through lutecium, and for lighting the corresponding atomic numbers upon the atomic number Nixie tubes 30 and 32;

Single pole, single throw toggle switch 54 for simultaneously darkening the neon bulbs 28 representing all the electrons in the N shell (fourth quantum level);

Rotary switch L for selectively lighting the neon bulbs 28 representing the valence electrons of the elements hafnium through mercury, and for lighting the atomic numbers corresponding to these elements upon the atomic number Nixie tubes 30 and 32;

Rotary switch M for selectively lighting the neon bulbs 28 representing the valence electrons of the elements thallium through radon, and for simultaneously lighting the atomic numbers which correspond to these elements upon the atomic number Nixie tubes 30 and 32;

Rotary switch N for selectively lighting the neon bulbs 28 representing the valence electrons of the elements francium through neptunium, and for lighting the corresponding atomic number upon the atomic number Nixie tubes 30 and 32;

Rotary switch O for selectively lighting the neon bulbs 28 representing the valence electrons of the elements plutonium through nobelium, and for lighting the corresponding atomic number upon the atomic number Nixie tubes 30 and 32;

Single pole, single throw toggle switch 56 for simultaneously darkening the neon bulbs 28 representing all the electrons in the O shell (fifth quantum level);

Rotary switch P for selectively lighting the neon bulbs 28 and 28a representing lawrencium and as yet nonexistent elements;

Single pole, single throw toggle switch 58 for simultaneously darkening the neon bulbs representing all of the electrons in the P shell (sixth quantum level);

Rotary switch 60 for selectively lighting the numbers on neutron units Nixie tube 36 and for simultaneously lighting the letters P and N on the front panel 12;

Rotary switch 62 for sequentially lighting the numbers on the neutron tens Nixie tube 38;

Rotary switch 64 for sequentially lighting the numbers on the neutron hundreds Nixie tube 40;

Single pole, single throw toggle switch 66 for energizing a flashing device (not seen) which automatically periodically makes and breaks the circuit to all otherwise lighted neon bulbs 28.

It is to be note that the rotary switches B through P and the triple pole, double throw toggle switch A, each of which selectively controls the illumination of the neon bulbs 28 representing electrons located in various subshells, are located at a vertical level on the end wall 14a of the device which corresponds approximately to the vertical position of the corresponding sublevel on the panel 12. The various switches are labeled (actual labels not shown) according to the particular elements on the panel 12 which are controlled by the respective switch. These features permit the instructor to manipulate the switches properly with a minimum of attention.

Referring next to FIGURES 2 and 3 of the drawings, the manner in which the neon bulbs 28 and 28a (representing atomic electrons) and the Nixie tubes 30, 32 and 34 (portraying the atomic numbers of the elements) are electrically wired is illustrated. In FIGURE 2, the electrical circuitry is schematically portrayed in a manner specifically selected to facilitate a better understanding of the order and logic which characterizes the electrical circuitry, and which allows the teaching device of the invention to be easily and correctly used by an instructor with a minimum of distraction from his notes and his students. By way of example, five of the fifteen electron bulbs control switches which are lettered A through P (with the exception of I, which letter is not used to avoid confusion) are illustrated in FIGURE 2. These five switches (which are switches A, B, F, G and H) and their associated circuitry, exemplify all wiring situations which occur in the case of the other (not shown) neon bulb control switches, and therefore are believed to sufficiently illustrate this portion of the invention.

In the FIGURE 2 wiring diagram, the large rectangular blocks 68 near the top of the figure each represent a particular neon bulb, 28 or 28a, or, in other words, a particular atomic electron appearing in the indicia 22 on the front panel 12 of the teaching device 10. Included within each of these rectangles 68 is a symbol indicating the location of the electron which the rectangle represents. To reiterate the previous explanation of this symbol, the last number in the symbol indicates the total number of electrons which are in the particular atomic sublevel occupied by the particular electron which the rectangle represents when the latter electron is the electron of highest energy in a particular atom. For example, the rectangle containing the symbol 1–s–1 is representative of the particular neon bulb 28 which, when lighted, represents a single electron in the "s" sublevel of the K shell of an atom. If it is the only neon bulb 28 lighted, this means that the electronic configuration represented by the illuminated neon bulb is that of hydrogen. In similar manner, the rectangle which contains the symbol 1–s–2 represents the second electron which is located in the "s" sublevel of the K shell, making a total of two electrons in this sublevel, and representting, when no other neon bulbs 28 are lighted, the electronic structure of the element helium. The rectangles 70 in the lower portion of FIGURE 2 contain symbols idenifying the element whose electronic configuration is represented by the neon bulbs 28 which are lighted when the circuit is initially made to the neon bulb symbolized by the rectangle 68 which is connected to the chemical element rectangle 70 by one of the electrical leads 72. Stated differently, for each neon bulb 28 or 28a which is lighted on the surface of front panel 12, there is a corresponding atomic shell and sublevel position, and a corresponding chemical element is formed by the addition of such electron to the atom. Thus, the electrical lead 72 which connects the neon bulb 28 representing the sole electron of hydrogen to its appropriate switch contact, subsequently to be described, is shown passing through the upper rectangle 68 containing the symbol 1–s–1 and the lower rectangle 70 which contains the chemical symbol for hydrogen, H, and its atomic number, 1.

The circles 74 immediately below the rectangles 70 in FIGURE 2 represent the contacts of the five neon bulb control switches, lettered A, B, F, G, and H, which are representative of the fifteen such switches which are provided on the end wall 14a. Although these switches have hereinbefore been referred to as neon bulb control switches, from the description which follows it will become manifest that these switches are also used to control the numbers which appear on the Nixie tubes 30, 32 and 34, and which represent the atomic numbers of the various chemical elements. The circles 74 below the rectangles 70 are arranged in horizontal rows and vertical columns. Within each horizontal row of circles 74, the circles are grouped according to the particular switch upon which the contact is located. This switch grouping is further indicated by the braces provided at the bottom of each group.

With the exception of switch A, which is a triple pole, double throw switch, each of the fourteen neon bulb (and atomic number Nixie tube) control switches is a rotary, multi-wafer switch. The number of wafers used on each switch shaft 76 (see FIG. 3) varies according to the circuit requirements of the teaching device. The wafer arrangement on each of the rotary, multi-wafer switches B, F, G and H shown in FIG. 2 is represented by the number, and vertical spacing, of the horizontal rows of the circles 74 which are shown for each switch. Thus, swtich B is provided with a total of three wafers with vacancies at the spaces which are available on the switch shaft 76 for two additional wafers between the first and second wafer, and another at the space available below the third wafer. In like manner, switch F carires five wafers, with one vacant available space, switch G carries four wafers, and switch H carries three wafers. The three lowermost wafer positions on the rotary switch shafts 76 are each used for mounting wafers which carry contacts connected in the atomic number Nixie tube circuits, and these lower wafers will hereinafter be referred to as Nixie wafers. Each of the wafers carries contacts connected in the circuitry and corresponding in number to the number of circles 74 grouped together in the horizontal row representing the wafer. Vertical alignment of contact circles 74 indicates that those contacts on the various wafers which are represented by the vertically aligned circles are all closed at the same time during the rotation of the shaft 76 on the particular rotary switch which carries the respective wafers.

To continue the description of the FIGURE 2 diagram, an electrical lead 78 is connected from one terminal of a 110 volt power source 80 to the center, or base, contact (not shown) of switch A which is used in conjunction with the uppermost circle contacts 1 and 2 shown in FIGURE 2. It should be noted that the lowermost circle contacts (also designated 1 and 2) on switch A, are contacts in the atomic number Nixie tube circuits and are only mechanically, and not electrically, associated with either the upper contacts, or their center or base contact (not shown). The same is true of the contacts on the lower wafers of the rotary switches B, F, G and H, which contacts are also in the atomic number Nixie tube circuits.

The other lead 82 from the 110 volt A.C. power source 80 is connected through the series of bus lines 84 and through a suitable current-limiting resistor (not shown) to each of the neon bulbs 28 representing the atomic extranuclear electrons. Each of the bus lines 84 is connected to a particular group of neon bulbs 28, which represent the electrons in a particular atomic shell. In each bus line 84, a single pole, single throw toggle switch (bearing reference characters 48 through 58) is provided so that the neon bulbs 28 representing the electrons in a particular atomic shell can be turned on and off at the will of the instructor as may be desired. Those "shell toggle switches," 48, 50 and 54, which are shown by way of example in FIGURE 2, are each labeled with the letter designation of the particular shell, K, L and N, respectively, which the switch controls.

As a final switch element of the FIGURE 2 circuitry should be mentioned the neon bulb flasher switch 66 which is placed in either lead 78 or 82 from the power source 80. This switch may be opened and closed by the instructor to cause all of the otherwise lighted neon bulbs 28 and 28a to flash on and off. This serves to demonstrate the dynamic, as opposed to static, status of atomic electrons.

FIGURE 2 is provided primarily for the purpose of enabling the reader to better follow the invention's operating sequence which is to be later described herein. The actual electrical wiring in the circuitry of the several rotary, multi-wafered switches, however, can best be understood by reference to FIGURES 3 and 4. In FIGURE 3, the three rotary switches F, G and H are illustrated in association with the neon bulbs 28 to which the contacts of their uppermost wafers (wafers 1, 2 and 3) are connected. The Nixie tubes 30, 32 and 34 to which the contacts of the lowermost wafers (wafers 3 and 4) are connected, are not shown in FIGURE 3, but the manner of functioning of the Nixie tube circuitry can be understood when FIGURE 4 is subsequently explained.

In the FIGURE 3 circuitry, the common electrical lead to one terminal of the 110 volt A.C. power source 80 is designated by reference character 78. The lead to the other source terminal is designated by reference character 82. This corresponds to the reference character designation of these leads in FIGURE 2. The uppermost wafers, designated wafer 1 in each case, are of the so-called progressive shorting type. That is, the common contact of the wafer is progressively connected to each succeeding contact on the wafer as the switch shaft 76 is rotated. The circuits made through each of the wafer 1 contacts are thus held, or remain closed, as each contact is touched by the rotating cam carried by the shaft 76. The remaining wafers, designated wafers 2, 3, 4 and 5, are, however, provided with a single moving switch arm which breaks the circuit to each previously touched contact as the shaft is rotated to pick up the next contact.

The electrical lead 78 is connected to each center of common contact of each of wafers 1, 2 and 3 so that, in actuality, these three wafers on each switch are connected in parallel with each other and each of the switches may be said to be connected in series with each other. The electrical lead 82, on the other hand, branches into a plurality of bus lines 84 which lead, in each case, through appropriate current-limiting resistors (not shown) to the group of neon bulbs 28 or 28a, which represent the electrons to be found in a given electron shell of an atom. One of the shell switches, 48 through 58 is interposed in each bus line 84 as previously explained. The center, or common, contacts of wafers 4, 5, and 6 (the latter wafer is not carried by switches F, G and H shown in FIGURE 3) are, in each case except switch P, connected to the zero or "off" contact of the corresponding wafers 4, 5 and 6 on the next switch to the left, or more technically stated, to the next adjacent switch between the referenced switch and the 220 volt source used to operate the atomic number Nixie tube circuit.

The center or common contacts of wafers 4, 5 and 6 on rotary switch P are connected to one terminal of the 220 volt D.C. source as shown in FIGURE 4, or may, of course, be connected through a rectifier and transformer (not shown) to the same 110 volt A.C. source 80 used to operate the neon bulbs 28 and 28a. To complete the atomic number Nixie tube circuit of FIGURE 4, the second terminal of the 220 volt D.C. power source is connected through a suitable current-limiting resistor to the anode 86 of each of the Nixie tubes 30, 32 and 34, and the ten cathodes (lettered 0 to 9) of each Nixie tube, representing numerical integers from 0 to 9, are connected to various selected contacts of the Nixie wafers on rotary switches B through O, and of the triple pole, double throw switch A.

The electrical circuitry (not shown) which is provided for energizing the neutron indicating Nixie tubes 36, 38 and 40, and which contains the rotary switches 60, 62 and 64 is very similar to that shown in FIG. 4 for the atomic number Nixie tubes 30, 32 and 34. The only difference of substance is that the rotary switches 60, 62 and 64 function independently of the switches controlling the illumination of the neon bulbs 28, and of each other. This permits the instructor to manipulate the neutron Nixie tubes 36, 38 and 40 in any desired manner, and to use them in explaining the neutronic constitution of isotopes and also the atomic weights of isotopes. Since one skilled in the art would be able to wire the rotary switches 60, 62 and 64 and their corresponding Nixie tubes 36, 38 and 40 in accordance with the example afforded by the preceding disclosure, this circuit has not been illustrated in the drawings. It need only be added that suitable contacts are provided in association with the rotary switch 60 which controls the neutron Nixie tube 36 (representing the units digit of the neutron number) in order to permit the P and N lights on the panel 12 to be illuminated when 1 or any higher number is shown on the three neutron Nixie tubes 36, 38 and 40.

Operation

The manner in which the teaching device of the invention is employed will next be described. Let it be supposed that the instructor wishes to first demonstrate the manner in which the electronic structure of the chemical elements is built up by the addition of extranuclear electrons to the atom in the order of increasing electron energy. The logical place to commence is with the element hydrogen, the element having the simplest electronic structure. Hydrogen, of course, has one proton in its nucleus, and has one electron revolving around its nucleus in a state of constant or dynamic vibration. This electron is relatively close to the nucleus and is said to occupy the first quantum level or K shell. The K shell has only one energy sublevel, designated the "$s$" sublevel, and therefore this single electron must be located in this "$s$" sublevel. Since the K shell is relatively close to the nucleus of the atom, electrons moving in the shell possess relatively low energy as compared to electrons in shells located more remotely with respect to the nucleus.

To demonstrate this knowledge by use of the teaching device of the present invention, the instructor throws the triple pole, double throw toggle switch A to a position such that the first of its uppermost contacts is closed. This closes the electrical circuit to the neon bulb 28 which is in the lower left hand corner of the rectangle 24 located at the lower left side of the front panel 12. The illumination of this bulb portrays the presence of one electron in the "$s$" sublevel of the first quantum level or K shell. This location of the electron is explained by the symbol $1-s-1$ which is written adjacent this bulb. At the same time that the switch A is moved to its first position to close contact 1 in the circuit to neon bulb 28 representing electron $1-s-1$, a contact in the circuit to atomic number Nixie tube 30 is closed (see FIGURES 2 and 4). This Nixie tube portrays a units digit, which in this case will be the number 1, as shown in FIG. 4. Thus, the atomic number of hydrogen, 1, is automatically display on the atomic number Nixie tubes.

To make clear in the minds of the students, the dynamic, as opposed to static, status of the electron, the instructor may close the flasher switch 66 to cause the neon bulb 28 to flash on and off.

The instructor is now ready to demonstrate the manner in which the atomic structure of helium differs from that of hydrogen. Switch A is thrown to its second position to close contact two in the neon bulb circuitry and also the second contact on switch A in the atomic number Nixie tube circuitry. FIG. 2 illustrates that this action results in the illumination of the neon bulb 28 which portrays the $1-s-2$ electron, or the second electron in the "$s$" sublevel of the first quantum level or K shell. FIGS. 2 and 4 show that this action also lights the number 2 on the atomic number Nixie tube 30. The student is now able to see that helium contains two extranuclear electrons, both located in the "$s$" sublevel of the K shell, that helium has an atomic number of 2 and therefore has two protons in its nucleus, that the number of electrons equals the number of protons, that helium is in the same period of the table as hydrogen and, if the instructor flashes the neon bulbs 28 on and off, that the electrons are in constant or dynamic motion. The instructor may then manipulate the switch 60 in the circuit to neutron Nixie tube 36 to place the number 2 thereon, demonstrating that the major isotope of helium contains 2 neutrons.

As a further aid to students in understanding the nature of the electron shells or principal quantum levels, the instructor may then open the switch 48 which darkens both of the neon bulbs 28 representing the K shell electrons $1-s-1$ and $1-s-2$. Actually, however, the shell switches 48 through 58 which are used to darken entire electrons shells may be used to best advantage after a number of the neon bulbs 28 have been illuminated to demonstrate the electronic structure of elements having higher atomic numbers.

The instructor next demonstrates the electronic configuration of lithium, the element of atomic number 3, and thus the element having three nuclear protons and three extranuclear electrons. This is accomplished by rotating the shaft 76 of rotary switch B until the circuit is made through the first contact of the first or number one wafer of this switch. Simultaneously, the number one contact on Nixie tube wafer 4 is closed by rotation of the shaft 76. Closure of the first contact on wafer 1 of rotary switch B illuminates the neon bulb 28 representing electrons $2-s-1$ that is, the first electron in the "$s$" sublevel of the second principal quantum level of L shell. The two neon bulbs 28 previously lighted to show the hydrogen and helium electrons remain lit. Thus, three neon bulbs 28 are lit, showing that lithium contains three electrons, two of which are in the same orbital in the "$s$" sublevel of the K shell, and one of which is in the "$s$" sublevel of the L shell. The higher vertical position of lithium's rectangle 24 on the panel 12 suggests the higher energy of its third electron, which electron is located in that rectangle.

Closure of the first contact on Nixie wafer 4 of rotary switch B results in the lighting of the numeral 3 on the units atomic number Nixie tube 30. Again the instructor may choose to manipulate switch 60 to show the neutronic structure of the lithium atom on the units neutron Nixie tube 36.

To display the electronic configuration of beryllium, the shaft 76 of rotary switch B is further rotated to close contact 2 on wafer 1. Since wafer 1 of all of the neon bulb rotary switches B through P is progressively shorting in its function as previously explained, and as shown in FIG. 3, contact 1 of the number 1 wafer on switch B remains closed and the neon bulb 28 representing electron 2–s–1 (first lighted to display lithium) remains lighted. The neon bulbs 28 representing electrons 1–s–1 and 1–s–2 are also lighted unless the instructor has chosen to darken these bulbs by the use of the K shell switch 48 or by opening switch A.

Closure of contact 2 on wafer 1 of rotary switch B lights the neon bulb represents the 2–s–2 electron. Four electrons are now represented, showing that beryllium has 4 electrons. The number 4 is displayed on the atomic number Nixie tube 30 by virtue of the closure of the second contact on Nixie wafer 4. It will be noted that the second electron in the "s" sublevel of the L shell goes into a common orbital with the first electron to occupy this particular sublevel as is indicated by the location of both electrons in the same rectangle 24. This demonstrates Pauli's principle that each orbital will accommodate two electrons with anti-parallel spins.

To demonstrate how the remainder of the L shell is filled with six electrons which occupy the "p" sublevel of this shell, the instructor continues to rotate the shaft 76 of rotary switch B. As he does so, additional contacts are picked up by progressively shorting wafer 1 and the neon bulbs representing the 2–p–1, 2–p–2, 2–p–3, 2–p–4, 2–p–5 and 2–p–6 electrons are lighted in that order as shown by FIG. 2. It is at this point that a new concept is presented to the students. According to Hund's rules, electrons tend to avoid being in the same orbital so far as possible, and two electrons occupying a pair of orbitals of equivalent energy level tend to have their spins parallel in their state of lowest energy. Bearing in mind that each rectangle 24 represents an atomic orbital, capable, according to the Pauli principle, of accommodating two electrons, the effect of Hund's rule on the way electrons are added to the atomic structure may be perceived from the operation of the invention.

Thus, in referring to FIGS. 1 and 2, it will be seen that when the third contact (number 3) on wafer 1 of switch B is closed, the neon bulb 28 representing electron 2–p–1 is lighted. The electronic configuration of the element boron is now displayed on the board. One bulb in the first rectangle 24 of the "p" sublevel of the L shell is lighted. This means that this orbital now has one electron in it. When the number 4 contact on wafer 1 of switch B is closed by further rotation of the shaft 76 of this switch, the next neon bulb 28 lit is not the second neon bulb in the first rectangle 24 of the "p" sublevel of the L shell, but is, instead, the first neon bulb to be lighted in the second rectangle 24 of this group of three rectangles. It may thus be seen that the new electron did not enter the same orbital as that occupied by the 2–p–1 electron, but entered a different orbital in the same energy sublevel. This is in accordance with Hund's rules. In like manner, closure of the next, or number 5, contact on wafer 1 of switch B illuminates the 2–p–3 electron located in the third rectangle 24 in the "p" sublevel of the L shell. Each rectangle 24 in this group of three now has only one electron in it, representing, from left to right, the elements boron, carbon and nitrogen, respectively.

As contact 6 on wafer 1 of rotary switch B is closed, the second neon bulb 28 in the first rectangle 24 of the "p" sublevel of the L shell is illuminated. This illustrates Pauli's principle again, and shows that in general, two electrons will occupy the same orbitals within a given sublevel before the second electron will go into or occupy any orbital in a sublevel of higher energy. As will be later shown, there are exceptions to the latter generality, which exceptions are susceptible of demonstration with the invention. In like manner, closure of contacts 7 and 8 on wafer 1 of rotary switch B results in the illumination of the neon bulbs 28 representing electrons 2–p–5 and 2–p–6. All orbitals in the "p" sublevel of the L shell are now occupied by two electrons with coupled spins.

At this point, the instructor may advantageously point out that the electronic structure shown on the front panel 12 by the lighted neon bulbs 28 is that of the element neon, an inert gas. The inert or non-reactive nature of the gas may be explained by showing that the L shell, which is the outermost shell of the neon atom, is filled with eight electrons. This may be emphasized by employing the switch 50 for darkening all the neon bulbs 28 in the L shell. It is to be recalled that the shell switches 48 and 50 enable the instructor to darken the bulbs representing all of the electrons in either the K or the L shell.

As the instructor lights each new and additional neon bulb 28 to form the electronic configuration of a new element, the atomic number corresponding to this element is automatically registered upon the atomic number Nixie tubes 30, 32, and 36. This automatic correlation is accomplished by virtue of the relationship of the Nixie tube wafers 4, 5, and 6 on the shaft 76 of each of the switches B through P to the neon bulb wafers 1, 2 and 3 also carried on the shafts of these same switches. An example of this relationship is illustrated in FIGURE 3. From this figure it may be seen, for example, that as the shaft 76 of rotary switch F is turned in a counterclockwise direction, the neon bulb 28 representing the 4–d–1 electron will be lighted when contact 3 of wafer 1 is closed. At the same time the 5–s–1 and 5–s–2 neon bulbs 28 are lighted by closure of the number 3 contacts of wafers 2 and 3. Now these particular electrons, together with all the previously lighted neon bulbs 28 representing electrons of lower energy, collectively portray the electronic configuration of the element yttrium as diagrammatically illustrated in FIGURE 2.

At the same time the number 3 contacts on wafers 1, 2 and 3 are being closed by rotation of the shaft 76 of rotary switch F, the number 3 contacts of Nixie wafers 4 and 5 on this same shaft are also closed. Closure of these latter contacts makes the circuits to the numerical cathode 9 of units atomic number Nixie tube 30 and to the numerical cathode 3 of tens atomic number Nixie tube 32 (see FIGURE 4). Thus, the atomic number of yttrium, 39, is registered on the atomic number Nixie tubes 30 and 32.

The progressive build-up of the electronic structure of the elements may be continued by the instructor by the further sequential lighting of the neon bulbs 28. In general the build-up will follow the pattern of lighting the bulbs in the vertical order, from bottom to top, in which their respective rectangles 24 or 26 appear upon the front panel 12. In other words, the bulbs in the 1–s sublevel are first illuminated, then those in the 2–s sublevel, then those in the 2–p sublevel, then those in the 3–s sublevel, then those in the 3–p sublevel, then those in the 4–s sublevel, then those in the 3–d sublevel and so on. Within a particular sublevel in a given shell, the build-up is in accordance with the Pauli principle and Hund's rules as hereinbefore mentioned.

An exception to this sequence of electron addition as represented by the successive lighting of the neon bulbs 28 is that after the 5–d–1 electron is lighted to form the electronic configuration of the element lanthanum (atomic number 57), the next fourteen electrons which are added to the atoms electron structure go into the seven orbitals of the "f" sublevel of the N shell (or fourth quantum level) and form the rare earths or lanthanide elements. Another exception exists with respect to the addition of electrons after the addition of the 6–d–1 electron to form actinium. The succeeding fourteen electrons go into the "f" sublevel of the O shell (fifth quantum level) and form the actinide elements. This "skipping over" of all but the first orbital of the "d" sublevels of the O and P shells until after the "f" sublevels of the N and O shells have been filled is suggested to the students by the slight vertical offset of the rectangles 24 which represent the first orbitals of these "d" sublevels from the remaining rectangles in the same horizontal groupings. By this arrangement, the much debated lanthanides (rare earths) and actinides are placed in a position in the periodic table such that chemical similarity can be explained.

The table provided on the front panel 12, in conjunction with the neon bulbs 28, may thus be used to illustrate the complete electronic configuration of all the elements. In general, any element's electronic configuration in the ground or unexcited state is "the sum" of the electronic configurations of all elements having a lower atomic number, e.g., boron with atomic number 5 has one electron in the 2–p sublevel (L shell), and additionally has the 2–s–2 electron of beryllium, the 2–s–1 electron of lithium, the 1–s–2 electron of helium and the 1–s–1 electron of hydrogen. There are, however, a number of exceptions to the foregoing generality —that is, some of the elements, according to spectographic data, do not actually have all of the sublevels except that of highest energy filled with electrons. An example of this is chromium, atomic number 24, which, according to the general structure suggested by the table, should contain four electrons in the 3–d sublevel and whose 4–s sublevel should be filled with two electrons. Spectrographic data indicates that, in actuality, chromium carries five electrons in the 3–d sublevel and only one electron in the 4–s sublevel.

As another exception might be mentioned niobium, atomic number 41, which, instead of having three electrons in the 4–d sublevel and two electrons in the 5–s sublevel as the table suggests, actually has four electrons in the 4–d sublevel and only one electron in the 5–s sublevel. In all, there are some 24 elements for which evidence exists of electronic configurations differing from the general configuration suggested by the position of their respective rectangles 24 in the table on the front panel 12.

In order to illustrate these exceptions to the student, the electrical circuitry of the invention is devised to light, in the case of each element, those neon bulbs 28 which are positioned on the panel 12 in the orbital and sublevel positions which the electrons actually or most probably occupy in the atom of the element. Thus, in referring to FIGURES 2 and 3, it will be seen that when the instructor wishes to show the electronic configuration of niobium, atomic number 41, the shaft 76 of rotary switch F is rotated until the number 5 contact on each of its wafers is closed. At this time, the 5–s–2 neon bulb 28, which has been lit previously, is darkened because there is no number 5 contact on wafer 3 which is connected to any of the bulbs 28. In place of the darkened 5–s–2 neon bulb 28, however, the two neon bulbs 28 representing the 4–d–3 and 4–d–4 electrons are lighted, showing that niobium has two electrons in the "d" sublevel of the N shell (fourth quantum level), but only one electron in the "s" sublevel of the O shell.

An additional use of the teaching device of the present invention is in illustrating the manner in which the elements in a given chemical family are grouped or related in their electronic configurations. It is, of course, well known that chemical elements which are grouped in the same vertical column in the usual periodic table display similar or related chemical properties. This is attributable to the similarity of the electronic configuration of these elements insofar as the electrons in the outermost or highest energy sublevels are concerned. In other words, the alkali metals of Group I-A include lithium, sodium, potassium, rubidium, cesium, and francium. Each of these elements has only a single electron in its orbital of highest energy, which in each case, is the single orbital in the "s" sublevel of the outermost shell. Because of this electronic configuration, each one of the alkali metal elements are extremely electropositive and display good electrical conducting properties.

Now, should the instructor desire to direct the attention of the students to the similarity of the valence electron strucure of the alkali metals, this may be effectively accomplished by turning the triple pole, double-throw toggle switch A to the "off" position to blank out the helium and hydrogen electrons; rotating the shaft 76 of rotary switch B to close its number 1 contact, and thus light the single valence electron (2–s–1) of lithium; rotating switch C to close its first contact, thus, illuminating the neon bulb 28 representing the 3–s–1 electron of sodium; rotating the shaft 76 of rotary switch D to close the number 1 contacts on its wafers, and thus illuminate the neon bulb 28 representing the 4–s–1 electron of potassium; rotating the shaft 76 of rotary switch F to close its number 1 contacts and eliminate the neon bulb 28 representing the 5–s–1 electron of rubidium; and similarly manipulating the rotary switches J and N to illuminate only the 6–s–1 and 7–s–1 electrons representing the elements cesium and francium. With all of the rotary switches in the position of closure described, only the valence electrons of the elements in the alkali metal family are illuminated. The student's attention is thus not distracted from the similarity of the electronic configuration of these elements by the lighting of all intermediate electrons—that is, electrons lying inside the sublevel carrying the valence electrons. The fact that each of the alkali metals is electro-positive can be easily explained by the presence of this single electron in the "s" sublevel of the various shells.

In similar manner, the relation between the electronic configuration of other families or groups of elements may also be illustrated without the illumination of an excessive number of neon bulbs not required to display for the student the most important electrons of the atoms of these elements—that is, the valence electrons. Thus, in the case of the inert gases, neon, argon, krypton, xenon and radon, the complete filling of the outermost shell or quantum level with 8 electrons can be effectively demonstrated by the described technique. The attention of the student may also be called to the fact that the "p" sublevel of each of the shells of these elements is completely filled with 6 electrons, which, in each case, are paired in three common orbitals, with each pair of electrons having their spins coupled or anti-parallel. Similar electronic similarities can be shown in other families of elements, such as the halogen family which includes the elements fluorine, chlorine, bromine, iodine and astotine.

As a final example of one of the many concepts which may be illustrated by the device of the present invention, the concept of positive and negative electrovalence may be mentioned. For example, in the case of the alkali metals, the sole valence electron which is located in the outermost or valence sublevel of these elements is easily yielded up or lost in order to produce a filled outer shell in accordance with the well known tendency of each atom to gain, lose, or share electrons with other atoms in order to fill its outer or valence shell. Thus, the alkali metal lithium, with one electron in the "s" sublevel of the L shell, readily surrenders this one electron so that its outer shell becomes the filled K shell. In order to show the propensity of certain elements to form positive ions by yielding or losing an electron to a more electronegative element, the instructor may ostentatiously cap, using the cap 42, the particular neon bulb 28 which, when lighted, represents the valence electron or electrons which are to be lost. The cap 42 blanks out or darkens these particular neon bulbs, thus clearly conveying to the mind of the student the concept of having these valence electrons removed from the electronic structure of the element to produce a positive ion.

In order to demonstrate the concept of positive electrovalence, the instructor may place the illuminable member 44 over one of the neon bulbs 28 representing the valence electron in an electronegative element. Thus, in FIGURE 1, the lighting device 44 has been placed over the 3–p–6 electron. From the indicia 22 on the panel 12, it will be apparent that chlorine has a total of 7 electrons in the M shell or third quantum level, and therefore requires one additional electron to complete this shell and form a stable structure. This additional electron is, of course, gained by the chlorine atom when the chlorine atom is converted to a negative chloride ion. This gain of an additional electron is portrayed by the instructor by placing the illuminable member 44 over the 3–p–6 electron, thus calling the students' attention to the fact that chlorine is an electronegative element and has a strong tendency to gain from another element, the one additional electron which is necessary to complete its M shell. By using the cap member 42 and illuminable member 44 successively upon two elements which are strongly electropositive and electronegative, the instructor may effectively demonstrate the manner in which positive and negative ions are formed and enter into combination to form a chemical compound. Thus, in FIGURE 1, the electronegative character of the chlorine atom is demonstrated by the use of illuminable member 44. The electropositive character of the potassium atom may then be demonstrated by the use of the cap member 42, which is placed over the 4–s–1 neon bulb 18. The two ions formed by the loss of the single valence electron of the potassium atom and the gain of a valence electron in the chlorine atom may thus combine to form the chemical compound potassium chloride.

From the foregoing description, it will be perceived that the present invention provides a novel, highly useful device which may be easily and effectively employed for teaching the atomic structure, and the chemical and physical properties of the elements. The device is particularly of value in enabling the instructor to convey to the students the relationship between the electronic configuration of an element and its chemical properties. The instructor may also employ the device to demonstrate the manner in which the principle energy levels, or shells, and their respective sublevels occur in each of the known elements and may be expected to occur in elements yet to be synthesized. No substantial difficulty is encountered by the instructor in learning to use the device, and once mastered, it may be employed in teaching with a minimum of distraction to both the students and the instructor resulting.

Although a preferred embodiment of the invention has been hereinbefore described in considerable detail, it is to be understood that the primary novelty and usefulness of the device reside in the particular arrangement of the indicia upon the front panel of the device, in conjunction with a specific arrangement and use of the neon bulbs for portraying the disposition of the various electrons in their respective elements. Many variations and innovations may be made in the electrical circuitry to give the specified effect. However, insofar as such variations and innovations continue to rely upon the broad principles which underlie the invention and which are the basis for the effectiveness of the invention as a teaching device, such innovations and variations are deemed to be encompassed by the spirit and scope of the invention except as the former may be necessarily excluded by the appended claims.

We claim:

1. A device for teaching atomic structure and the properties of elements comprising:

display means having a generally vertically extending surface for visual display of indicia representing the periodic recurrence of similar chemical properties of the chemical elements;

indicia on said surface portraying chemical elements in an order and arrangement relative to each other such that the periods and groups of said elements may be visually discerned, said order and arrangement being based upon the sequential increase of energy of the extranuclear electrons in the atoms of each of said elements;

visual means associated with said indicia for graphically portraying the extranuclear electron structure of said elements, said visual means including individual light sources each representative of single extranuclear electrons with said light sources being correlated with said element portraying indicia in their respective positions on said board with the indicia and their respective extranuclear electron representing light sources arranged on said surface in vertically extending columns representative of families of elements, in horizontally extending rows representative of energy sublevels containing extranuclear electrons and diagonal groupings representative of extranuclear electron shells or quantum levels, said light sources and indicia being further positioned on said board with those light sources and indicia representative of extranuclear electrons of relatively lower energy positioned generally lower on said board than those light sources and indicia representative of extranuclear electrons of relatively higher energy; and means for selectively illuminating the several light sources of said visual means to emphasize the electron structure of at least one of said elements with said selective illumination being effected in a sequence corresponding to the sequence of formation of new elements by the inclusion in the atomic structure of such new elements of electrons of successively higher energy levels.

2. A teaching device as claimed in claim 1 wherein said means for selectively illuminating said light sources comprises electrical circuitry connected to said light sources, said electrical circuitry including selective switching means for sequentially electrically energizing said light sources in a sequence such that, subject to the Pauli principle and Hund's rules regarding occupation of atomic orbitals by two electrons, the light sources are energized in the order of the increasing energy of the electrons which they represent.

3. A teaching device as claimed in claim 1 and further characterized to include means for numerically indicating on said surface the atomic number of the element whose electron structure is emphasized using said selective illuminating means.

4. A teaching device as claimed in claim 1 and further characterized to include means for numerically indicating on said surface, the number of neutrons in the atoms of each of said elements.

5. A teaching device as claimed in claim 2 and further characterized to include second selective switching means in said electrical circuitry for making and breaking the circuit to a plurality of said light sources representing all the electrons in any preselected shell of those shells occupied by extranuclear electrons in the atomic structure of the chemical elements.

6. A teaching device as claimed in claim 2, and further characterized to include flasher means in said electrical circuitry for alternately making and breaking the electrical circuit to said light sources whereby the dynamic status of atomic electrons may be emphasized in the mind of an observer.

7. A teaching device as claimed in claim 2 wherein said selective switching means comprises a plurality of rotary, multi-wafered switches connected in electrical parallel and having the contacts on each of said wafers connected to said light sources in a predetermined pattern so that said switches may be selectively manipulated to close said contacts and energize said light sources to illustrate the similar electron structure of any desired family of elements.

8. A teaching device as claimed in claim 7 wherein the wafers of each of said switches are positioned on a common shaft, and further characterized to include:

additional wafers secured to each of said shafts for rotation with said first mentioned wafers;

three illuminable numerical indicating devices for visually portraying a number from 1 to 199 on said display board; and additional electrical circuitry connected between some of the contacts of said additional wafers and said illuminable numerical indicating devices for visually portraying on said illuminable numerical indicating devices, the atomic number of the element whose electron structure is represented by the light sources which are energized by rotating the shafts of said rotary, multi-wafered switches.

9. A teaching device as claimed in claim 1 wherein said indicia includes numerals and letters indicating electron shells, sublevels and the number of electrons in each of said sublevels.

10. A teaching device as claimed in claim 1 wherein said display means is a hollow, right parallelpiped comprising a rectangular front panel carrying said indicia for the visual display thereof;

a pair of opposed, rectangular end walls extending normal to said rectangular front panel from two opposite sides thereof;

a top and a bottom wall extending parallel to each other and normal to said end walls and front panel; and a pair of contiguous, rectangular back panels hinged at one of their sides to each other and having a hinged connection to one of said end walls, said back panels pivoting into a common plane extending parallel to said front panel.

References Cited by the Examiner
UNITED STATES PATENTS 2,085,881    7/37    Van Doren _____ 35—18
2,492,563   12/49    Flickinger et al.
2,891,322    6/59    Brownlee _____ 35—18

JEROME SCHNALL, *Primary Examiner.*

L. SMILOW, *Examiner.*